United States Patent [19]

Okada et al.

[11] 3,714,244
[45] Jan. 30, 1973

[54] METHOD FOR PURIFYING 1,12-DODECANEDIOIC ACID

[75] Inventors: Yoshihiko Okada; Takashi Matsubara, both of Nagoya, Japan

[73] Assignee: Toagosei Chemical Industry Co., Ltd., Tokyo, Japan

[22] Filed: April 6, 1971

[21] Appl. No.: 131,817

[30] Foreign Application Priority Data

April 9, 1970 Japan ............................45/29772

[52] U.S. Cl. ............................260/537 P, 260/531 R
[51] Int. Cl. ............................................C07c 51/42
[58] Field of Search ................................260/537 P

[56] References Cited
UNITED STATES PATENTS 3,637,832  1/1972  White et al. ..................260/537 P
3,366,680  1/1968  Minisci et al. .................260/537 P Primary Examiner—Vivian Garner
Attorney—Karl W. Flocks

[57] ABSTRACT

Crude 1,12-dodecanedioic acid obtained by oxidation of cyclododecanol and/or cyclododecanone by nitric acid is purified by dissolving the crude 1,12-dodecanedioic acid in an aqueous nitric acid solution containing 40 to 80 percent by weight of nitric acid at 85°–105°C, passing the resulting solution through a filter aid diatomaceous earth having particle sizes of 1–100 microns, cooling the resulting filtrate to 40°–90°C thereby to crystallize 1,12-dodecanedioic acid. The thus purified 1,12-dodecanedioic acid has a good purity and a less susceptibility of discoloration appearing when dissolved in an alkali.

8 Claims, No Drawings

METHOD FOR PURIFYING 1,12-DODECANEDIOIC ACID

This invention relates to a method for purifying 1,12-dodecanedioic acid, and more particularly to a method for purifying 1,12-dodecanedioic acid obtained by oxidation of cyclododecanol and/or cyclododecanone by nitric acid.

1,12-Dodecanedioic acid is an industrially very useful material and is used as a raw material for polyamide and polyester. Particularly high purity is required for 1,12-dodecanedioic acid, when used.

However, the 1,12-dodecanedioic acid (which will be hereinafter referred to as "DDA") obtained by oxidation of cyclododecanol and/or cyclododecanone by nitric acid contains by-product dibasic acids having 11 or less carbon atoms and nitrogen-containing impurities, and thus DDA having a good purity and a less susceptibility of discoloration appearing when dissolved in an alkali has not been heretofore readily obtained. For example, the crude DDA crystals obtained by carrying out an oxidation reaction at 60°C in the presence of a copper-ammonium metavanadate catalyst using 60 percent nitric acid and separating the resulting product at 30°C by filtration contains 500–2,000 ppm (in terms of nitrogen, $N_2$) of such nitrogen-containing compounds as nitro and nitroso compounds, nitrite esters, etc. and 2–3 percent of dibasic acids having 11 or less carbon atoms, and is colored to yellow when dissolved in an alkali (optical density: 2 or higher). These impurities and coloring cannot be removed almost at all by washing the crude DDA with water.

Heretofore, a recrystallization method using such an organic solvent as toluene, ethyl alcohol, polyethyleneglycol dialkylether, acetone or acetic acid has been proposed as the method for purifying the crude DDA, but such a method has not been utilized widely as an industrial scale process, because of a higher DDA cost due to the use of the solvent, inevitable loss of DDA in the solvent by dissolution, the necessity for solvent recovery and the necessity for several recrystallizations when a high purity DDA is to be obtained by mere recrystallization method, as will be shown in the following example. For example, Japanese Pat. publication No. 23389/64 discloses an example that the nitrogen content of crude DDA can be reduced from 1,400 ppm to 210 ppm by recrystallization by ethyl acetate, and successively from 210 ppm to 150 ppm by the second recrystallization by ethyl acetate. This example shows that it is difficult to purify crude DDA by mere recrystallization by an organic solvent.

On the other hand, French Pat. No. 1,392,568 discloses a method for separating lower dibasic acids from crude DDA by treating the crude DDA with boiling water, but even in that process, the separation efficiency is not always satisfactory. For example, a crude DDA containing 98.6 percent 1,12-dodecanedioic acid, 1 percent 1,11-un-decanedioic acid and 0.2 percent 1,10-decanedioic acid can be purified to a pure DDA having 99.5 percent 1,12-dodecanedioic acid, 0.4 percent 1,11-un-decanedioic acid and a trace of 1,10-decanedioic acid by boiling water treatment.

Further, a recrystallization method by hot water under pressure was proposed (Japanese Pat. publication No. 23389/64). However, these prior art methods are not so effective for removing the nitrogen-containing compounds and separating lower dibasic acids.

An object of the present invention is to improve these disadvantages inherent in these prior art methods and provide a method for obtaining DDA having a high purity and a less susceptibility of discoloration appearing when dissolved in an alkali in high yield.

The present inventors have found an unexpected fact that the crude DDA has a considerably high solubility in an aqueous nitric acid solution, which cannot be expected in a water solvent system, the organic nitrogen-containing compounds contained in the crude DDA are very rapidly decomposed to the compound having a good solubility under said dissolution treatment in said aqueous nitric acid solution, and the lower dibasic acids having 11 or less carbon atoms have a considerably high solubility in said aqueous nitric acid solution.

Further, the present inventors have found that when the DDA crystals are obtained by cooling and crystallizing the aqueous nitric acid solution of crude DDA, the nitrogen-containing compounds and the by-product acids having 11 or less carbon atoms can be effectively separated and removed therefrom by properly selecting the separation temperature.

As a result of various studies on an improvement in discoloration appearing when the DDA is dissolved in an alkali, heat stability at a high temperature (for example, the degree of discoloration at 250°C in a nitrogen gas stream) and polymer qualities, particularly discoloration when used in the polyamide synthesis, on the basis of said findings, the present inventors have found that these properties can be improved very remarkably by filtering the aqueous nitric acid solution of crude DDA through a filter aid having particle sizes of 1 to 100 microns in main, before the solution is cooled and crystallized, and have accomplished the present invention.

According to the result of the studies on a correlation between the quality of the DDA and the quality of the polymer synthesized from the DDA, made by the present inventors, it has been found that the degree of the discoloration appearing when the DDA is dissolved in the alkali and the degree of heat stability at a high temperature, for example, 250°C are in a close relation to the degree of discoloration of the polyamide.

That is to say, to obtain a polyamide unsusceptible to the discoloration, it is important to use DDA having a discoloration of 0.05 or less when dissolved in an alkali and a heat stability of 500 or less in terms of hazen color unit (in nitrogen gas stream at 250°C for 2 hours). In the present invention, these conditions can be satisfied completely.

Various filter aids such as diatomaceous earth, active carbon, etc., are commercially available, but the filter aid used in the present invention is the so-called diatomaceous earth. For example, Celite 545, Celite 535, Celite 503, HiFlo supercell, standard supercell, and Filter cell (each being trademark of Johns Manville Corp. USA for the diatomaceous earth) can be used in the present invention.

The diatomaceous earth used in the present invention ranges in particle sizes of 1 to 100 microns. The diatomaceous earth having particle sizes of less than 1 micron is so high in filtration resistance that it is practically unsuitable. The diatomaceous earth having particle sizes of more than 100 microns is not effective almost at all as a filter aid or a larger amount thereof must be used when fine materials are to be filtered off. Thus, the diatomaceous earth having particle sizes of more than 100 microns is disadvantageous for an industrial practice. It is preferable to use the diatomaceous earth by precoating it in advance, but it is possible to use it in a suspended state.

It is desirable that the filter aid used in the present invention can form a compact filter layer and a function of the so called absorbing agent is not so much required. That is to say, it is desirable that the surface structure of the filter aid is in a form suitable for establishing a compact filter layer.

The reasons why the diatomaceous earth is most suitable for attaining the object of the present invention is not clear yet, but it seems that the diatomaceous earth has a special affinity towards the impurities, which are causes for effecting discoloration and impairing the heat stability, when the diatomaceous earth is brought in contact with the aqueous nitric acid solution of the crude DDA. This assumption would hold true from the fact that, for example, active carbon, which has been so far used frequently in adsorption and removal of the impurities, cannot attain the object of the present invention (see Comparative Example 4 which follows), and it is clear that these impurities cannot be removed simply by an adsorbing function.

The diatomaceous earth can be used in any amount, so long as the filtration resistance is within an allowable range, and a very small amount of filtering cake can satisfy the desired duty. That is, it is possible to treat the aqueous nitric acid solution in an amount 10,000 to 100,000 times the amount of the diatomaceous earth used.

The aqueous nitric acid solution containing 40 to 80 percent by weight of nitric acid is used in the present invention to dissolve the crude DDA. Preferably, the solution containing 50 to 70 percent by weight of nitric acid is used. The solution containing less than 40 percent by weight of nitric acid is not enough to decompose the nitrogen-containing compounds, and when the nitric acid concentration exceeds 80 percent, the yield of DDA is lowered. Said concentration of the aqueous nitric acid solution is defined by percent by weight under the heating treatment condition ($HNO_3/HNO_3 + H_2O$).

0.5 to 10 parts, preferably 1 to 3 parts by weight of nitric acid is used per one part by weight of crude DDA. When the crude DDA is dissolved in the aqueous nitric acid solution, it is preferable to dissolve it under heating. Its optimum temperature depends upon the concentration of the aqueous nitric acid solution, but a temperature over 120°C is not particularly necessary. The heating temperature is above 70°C, preferably in a range of 85°–105°C. The time required for the dissolution by heating is 20 minutes to 2 hours, preferably 30 to 60 minutes.

When the crude DDA is dissolved in the aqueous nitric acid solution, a considerable amount of NO and $NO_2$ is generated, but NO and $NO_2$ can be recovered, for example, as nitric acid by absorbing them in water. Thus, the loss of nitric acid at the dissolution is very small.

The solution resulting from the dissolution by heating can be passed through the filter aid having particle sizes of 1 to 100 microns in main at any temperature, so long as the temperature can maintain DDA in a dissolved state. For example, the filtration can be carried out at 95°C. Then, the filtrate is cooled to recrystallize DDA, and successively the deposited crystals are separated from a mother liquor by filtration, whereby DDA crystals having a high purity, a good heat stability and a less susceptibility of discoloration by an alkali can be obtained with a recovery efficiency of 97 percent or higher by mole.

The temperature for crystallizing the filtrate depends upon the amount of impurities, particularly 1,11-undecanedioic acid, contained in the crude DDA and the concentration and the amount of the aqueous nitric acid solution to be used, but usually is in a range of 40°–90C. For example, the optimum temperature is 70°–80C when an aqueous 60 percent nitric acid solution is used.

In the crystallization, the well-known continuous or batch-type crystallizer can be usually used. The separation of crystals can be carried out by filtration or centrifugal separation, and the resulting mother liquor can be recycled to and reused in the oxidation system.

According to the present invention, 1,12-dodecanedioic acid having a high purity, a good heat stability and a less susceptibility of discoloration by an alkali can be readily obtained in high yield, as described above, and the present invention is useful for obtaining the DDA crystals, particularly applicable to the synthesis of polyamide or polyester.

Now, the present invention will be explained in detail, referring to Examples, Reference Example and Comparative Example. The results of Examples and Comparative Examples are listed in the following Table 2.

REFERENCE EXAMPLE

Into a 20-l stainless steel reactor provided with a stirrer was placed a solution prepared by dissolving 29.92 g of copper powders and 9.97 g of ammonium metavanadate in 24,934 g of an aqueous 60 percent wt. nitric acid solution. To said solution was supplied a solution mixture prepared by dissolving 2,456.6 g of a mixture consisting of 95 percent by weight of cyclododecanol and 5 percent by weight of cyclododecanone in 454.3 g of cyclododecanol by heating, while keeping a reaction temperature at 60°C over a period of 100 minutes. After the completion of the supply, the temperature was elevated and kept at 70°C for 90 minutes. Then, the reaction solution was cooled down to 30°C, and the resulting crystals were filtered and separated, and washed with 20 l of water.

The crystals were made wet with 10 l of water and centrifuged in a centrifugal separator, whereby 3,729 g of crude DDA was obtained. The thus obtained crystals were butylesterized and analyzed by gas chromatography. It was found that the yield to the raw materials was 88.8 percent by mole, the dibasic acids having 11 and 10 carbon atoms in the crude DDA were 2.7 and 0.4 percent by weight, respectively, and water was 8.6 percent by weight. The crude DDA was dried at 95°C for 2 hours in an air drier, and, after drying, subjected to nitrogen analysis by Kjeldahl method. It was found that the nitrogen content was 840.3 ppm.

EXAMPLE 1

200 g of the crude DDA (in a wet state) obtained in Reference Example was dissolved in 400 g of an aqueous 67 percent wt. nitric acid solution under heating, and the resulting solution was kept at 95°C for 30 minutes with stirring. Then, the said nitric acid was passed through a filter precoated with 5 g of filter aid, Celite 545 having particle sizes of 12 to 40 μ (the particle sizes being represented by 10 percent at a lower limit to 80 percent at an upper limit). Then, the filtrate was cooled down to 40°C with stirring over a period of 120 minutes. The DDA deposited as crystals was filtered and separated, and washed with 1 l of hot water and dried at 95°C for 2 hours with air, whereby 163 g of crystals was obtained. Recovery efficiency from the crude DDA was 97 percent by mole. The analysis of DDA before and after the purification is shown in Table 1.

TABLE 1

| | Crude DDA | Purified DDA |
|---|---|---|
| Nitrogen content | 840.3 ppm | 45 ppm |
| 1,11-Undecanedioic acid content | 2.7 % | 0.1% or less |
| 1,11-decanedioic acid content | 0.4 % | 0.0 |
| Discoloration by alkali dissolution | | |

| (optical density)[1] | 2 or more | 0.025 |
| Heat stability | 1,000 or higher | 300 |

Note 1. 1 g of DDA is dissolved in 25 cc of 1N sodium hydroxide solution and a transmission (T percent) is measured at a wavelength of 370 millimicron and a cell of 10 mm. The transmission of 1N sodium hydroxide solution is presumed to be 100, and the discoloration by alkali dissolution is defined by the following formula: Discoloration by alkali dissolution = log (100/T)

Note 2. 20 g of DDA is placed in a colorimetric tube and melted in a nitrogen gas stream at 250°C and its discoloration is measured after 2 hours. The value is shown in hazen color unit (JIS-K-4172).

Further, 700 g of the purified DDA obtained according to the same manner as in Example 1 was suspended in 700 g of water and heated to 60°–70°C. Then, an aqueous solution of 50 percent by mole of hexamethylene-diamine was added thereto drop by drop and the pH was kept to 7.5, whereby a uniform aqueous solution of nylon salt was obtained.

1,500 g of said solution was fed to a 2-l capacity stainless steel autoclave (SUS-32) and the autoclave atmosphere was replaced with nitrogen completely. Then, the temperature of the autoclave was elevated. When the temperature of the autoclave was elevated to 70°C, the autoclave atmosphere was replaced again with the nitrogen, and the nitrogen pressure was increased to 10 kg/cm² gage. Further, the autoclave temperature was gradually elevated, kept at 220°C for one hour, and then elevated to 260°C.

The autoclave pressure was returned to the atmospheric pressure over about one and a half hour while keeping the temperature at 260°C. Then, the nitrogen gas was passed through the autoclave for three hours, and then the resulting polymer was cooled down to the room temperature in a nitrogen gas stream, whereby nylon 6–12 was obtained. The thus obtained polymer was purely white and had no discoloration, a relative viscosity of 1.75 (0.1 g of nylon/25 cc of metacresol: 20°C) and a molecular weight of $1.7 \times 10^4$ (measured by an osmotic pressure method).

The results are shown in Table 2.

EXAMPLES 2–6

Treatment was carried out in the same manner as in Example 1, except that the filter aids listed in Table 2 were used in place of the filter aid of Example 1. The results are shown in Table 2. The content of by-product dibasic acid after the purification was almost equal to those of Example 1.

COMPARATIVE EXAMPLE

Treatment was carried out in the same manner as in Example 1, except that no filter aid was used. The result is shown in Table 2.

COMPARATIVE EXAMPLES 2–4

Treatment was carried out in the same manner as in Example 1, except that filter aids other than diatomaceous earth were used. The results are shown in Table 2.

TABLE 2

| | | Purification result | | | |
|---|---|---|---|---|---|
| | Filter aid | Particle size, μ (10% at a lower limit to 80% at an upper limit) | Nitrogen content (p.p.m.) | Discoloration by alkali dissolution optical density | Heat stability (Hazen color unit) | Color of polyamide |
| Example 1 | Celite 545 | 12–40 | 45 | 0.025 | 300 | White. |
| Example 2 | Celite 535 | 8–37 | 47 | 0.030 | 300 | Do. |
| Example 3 | Celite 503 | 6–32 | 46 | 0.027 | 250 | Do. |
| Example 4 | Hi-Flo Supercell | 3–21 | 48 | 0.032 | 350 | Do. |
| Example 5 | Standard Supercell | 2–16 | 44 | 0.029 | 200 | Do. |
| Example 6 | Filter cell | 2–13 | 49 | 0.026 | 250 | |
| Comparative Example 1 | No filtration | | 55 | 0.074 | 800 | Brown. |
| Comparative Example 2 | Glass filter [1] | (10–5) | 49 | 0.060 | 600 | Grey. |
| Comparative Example 3 | Silica gel | 100–200 | 48 | 0.055 | 700 | Brown. |
| Comparative Example 4 | Granular active carbon | | 46 | 0.048 | 600 | Do. |

[1] Glass filter No. 4 made by Shibata Kagaku Kikai Kogyo K. K., Japan.

What is claimed is:

1. A method for purifying crude 1,12-dodecanedioic acid obtained by oxidation of cyclododecanol or cyclododecanone or mixtures thereof by nitric acid, which comprises dissolving crude 1,12-dodecanedioic acid in an aqueous nitric acid solution containing 40 to 80 percent by weight of nitric acid at a temperature above 70°C, passing the resulting solution through a filter of diatomaceous earth having particle sizes of 1–100 microns, cooling the resulting filtrate to 40°–90 °C thereby to crystallize 1,12-dodecanedioic acid.

2. A method according to claim 1, wherein said aqueous nitric acid solution contains 50–70 percent by weight of nitric acid.

3. A method according to claim 1, wherein said resulting solution has a temperature of about 95°C.

4. A method according to claim 1, wherein 0.5 to 10 parts by weight of said nitric acid is used to dissolve one part by weight of said crude 1,12-dodecanedioic acid.

5. A method according to claim 4, wherein the weight ratio of nitric acid to crude 1,12-dodecanedioic acid is 1–3:1.

6. A method according to claim 1, wherein the crude 1,12-dodecanedioic acid is dissolved in the aqueous nitric acid solution at 85°–105°C.

7. A method according to claim 6, wherein said aqueous nitric acid solution contains about 60 percent by weight of nitric acid.

8. A method according to claim 7, wherein the filtrate is cooled to 70°–80°C thereby to crystallize 1,12-dodecanedioic acid.

* * * * *